US012493256B2

(12) United States Patent
Maeda et al.

(10) Patent No.: US 12,493,256 B2
(45) Date of Patent: Dec. 9, 2025

(54) FIXING ROTATING MEMBER AND FIXING APPARATUS, AND ELECTROPHOTOGRAPHIC IMAGE FORMING APPARATUS

(71) Applicant: CANON KABUSHIKI KAISHA, Tokyo (JP)

(72) Inventors: Matsutaka Maeda, Kanagawa (JP); Takaaki Tsuruya, Shizuoka (JP); Akira Okano, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/920,000

(22) Filed: Oct. 18, 2024

(65) Prior Publication Data

US 2025/0138459 A1 May 1, 2025

(30) Foreign Application Priority Data

Oct. 27, 2023 (JP) ................................ 2023-185008

(51) Int. Cl.
*G03G 15/20* (2006.01)

(52) U.S. Cl.
CPC ..... *G03G 15/2057* (2013.01); *G03G 15/2064* (2013.01); *G03G 2215/2051* (2013.01)

(58) Field of Classification Search
None
See application file for complete search history.

(56) References Cited

U.S. PATENT DOCUMENTS

| | | | | |
|---|---|---|---|---|
| 2006/0216078 A1* | 9/2006 | Higashi | G03G 15/2057 | 399/333 |
| 2007/0110467 A1* | 5/2007 | Ohno | G03G 15/205 | 399/70 |
| 2007/0242988 A1* | 10/2007 | Seo | G03G 15/2042 | 399/328 |
| 2008/0205948 A1* | 8/2008 | Baba | G03G 15/2053 | 399/329 |
| 2012/0251205 A1* | 10/2012 | Nakao | G03G 15/2053 | 399/329 |
| 2014/0105659 A1* | 4/2014 | Miyahara | G03G 15/2053 | 399/333 |
| 2018/0373183 A1* | 12/2018 | Murata | B32B 7/022 | |
| 2019/0187581 A1* | 6/2019 | Adachi | G03G 15/20 | |
| 2024/0210861 A1* | 6/2024 | Tsuruya | G03G 15/2017 | |

FOREIGN PATENT DOCUMENTS

JP 2004-70191 A 3/2004

* cited by examiner

*Primary Examiner* — Sevan A Aydin
(74) *Attorney, Agent, or Firm* — Venable LLP

(57) ABSTRACT

A fixing rotating member comprising: a first resin layer having an endless shape; at least one heating layer on the first resin layer; a second resin layer on the heating layer; an elastic layer on the second resin layer; and, a surface layer on the elastic layer, wherein the first resin layer and the second resin layer are different from in elastic modulus at a specific temperature by at least 10%, and a neutral axis in a thickness direction of the fixing rotating member is located in the heating layer or in the second resin layer in the central region and the end region, the end region is a region from both ends of the heating layer in the width direction to a specific length toward a center, and the central region is a region of a specific length from the center to both ends.

9 Claims, 6 Drawing Sheets

FIXING ROTATING MEMBER AND FIXING APPARATUS, AND ELECTROPHOTOGRAPHIC IMAGE FORMING APPARATUS

BACKGROUND OF THE INVENTION

Field of the Invention

The present disclosure relates to a fixing rotating member and a fixing apparatus for use in an electrophotographic image forming apparatus such as a copier or a printer having an electrophotographic system. Further, the present disclosure relates to an electrophotographic image forming apparatus.

Description of the Related Art

A general fixing apparatus mounted in an electrophotographic image forming apparatus such as an electrophotographic copying machine or printer fixes a toner image on a recording material by heating while transporting the recording material carrying an unfixed toner image at a nip part formed by a fixing rotating member to be heated and a pressing roller that comes into contact therewith.

A fixing apparatus having a fixing rotating member equipped with a conductive layer, and a method of heating the conductive layer by electromagnetic induction heating has been put into actual use. A fixing apparatus having an electromagnetic induction heating system can heat a fixing rotating member in a short time.

Japanese Patent Application Publication No. 2004-070191 discloses a belt that can be preferably used for an electromagnetic induction heating system. The invention in accordance with Japanese Patent Application Publication No. 2004-070191 addresses a problem of reducing the strain of a metal layer when bending deformation has repeatedly occurred in an endless-shaped belt provided with the metal layer functioning as a heating layer, and preventing cracks or permanent deformation from occurring in the metal layer. Then, it is disclosed that such a problem can be solved by an endless-shaped belt having a base layer comprising a synthetic resin, a metal layer stacked thereon, and a coat layer comprising a synthetic resin further stacked thereon, wherein the metal layer is formed in the vicinity of the neutral axis where no strain is caused when bending deformation is caused at the belt. Herein, it is described that the neutral axis is the line of intersection between the surface that does not undergo strain when bending deformation is caused at the fixing belt, and the cross section of the fixing belt (paragraph [0033]). Namely, the neutral axis can be defined as the position where the tensile force and the compressive force are in balance at the cross section in the direction along the circumferential direction of an endless-shaped belt, for example, when the endless-shaped belt has been bent and a bending moment has occurred.

SUMMARY OF THE INVENTION

At least one aspect of the present disclosure is targeted at providing a fixing rotating member excellent in durability even when a heating layer is interposed by different materials. Further, at least one aspect of the present disclosure is targeted at providing a fixing apparatus contributing to the stable formation of a high quality electrophotographic image. Still further, at least one aspect of the present disclosure is targeted at providing an electrophotographic image forming apparatus capable of forming a high quality electrophotographic image with stability.

At least one aspect of the present disclosure is directed to providing a fixing rotating member comprising:

- a first resin layer having an endless shape;
- at least one heating layer on an outer circumferential surface of the first resin layer;
- a second resin layer on an outer circumferential surface of the heating layer;
- an elastic layer on an outer circumferential surface of the second resin layer; and,
- a surface layer on an outer circumferential surface of the elastic layer, wherein
- the first resin layer and the second resin layer are different from each other in elastic modulus at a temperature Tc, which is from 160 to 200° C., by at least 10%, and
- when a temperature of an outer surface in a central region of the fixing rotating member is referred to as Tc, and a temperature of an outer surface in an end region is referred to as Tc+50° C., a neutral axis in a thickness direction of the fixing rotating member is situated in the heating layer or in the second resin layer in the central region and the end region,
- for the central region and the end region,
  - when a number of the heating layers observed at a cross section in a width direction orthogonal to a circumferential direction of the fixing rotating member is one, the end region is a region from both ends in the width direction up to 0.02×L1 toward a center in the width direction of the heating layer, and the central region is a region from the center up to 0.48×L1 toward both ends, where the L1 is a length from one end to the other end of the heating layer, and
  - when the number of the heating layers observed at a cross section in the width direction orthogonal to the circumferential direction of the fixing rotating member is plural, the end region is a region from both ends in the width direction of a heating layer group comprising the plurality of heating layers up to 0.02×L2 toward the center in the width direction, and the central region is a region from the center up to 0.48×L2 toward the both ends, where the L2 is a length from one end to the other end of the heating layer group.

In accordance with at least one aspect of the present disclosure, it is possible to obtain a fixing rotating member excellent in durability even when a heating layer is interposed by different materials. Further, in accordance with at least one aspect of the present disclosure, it is possible to obtain a fixing apparatus using the fixing rotating member. Still further, in accordance with at least one aspect of the present disclosure, it is possible to obtain an electrophotographic image forming apparatus using the fixing apparatus.

Further features of the present invention will become apparent from the following description of exemplary embodiments with reference to the attached drawings.

DESCRIPTION OF THE EMBODIMENTS

Figure 1:
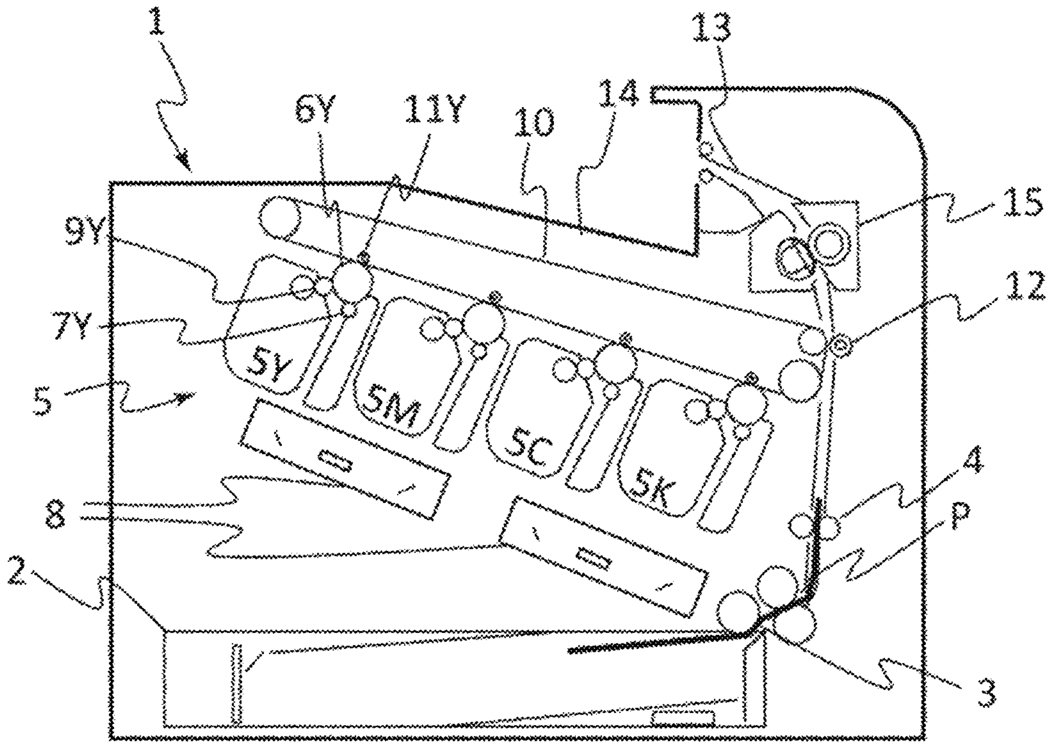
FIG. 1 is a schematic view of an electrophotographic image forming apparatus in accordance with an embodiment.

In the present disclosure, the expression of "from XX to YY" or "XX to YY" indicating a numerical range means a numerical range including a lower limit and an upper limit which are end points, unless otherwise specified. Also, when a numerical range is described in a stepwise manner, the upper and lower limits of each numerical range can be arbitrarily combined. In addition, in the present disclosure, for example, descriptions such as "at least one selected from the group consisting of XX, YY and ZZ" mean any of XX, YY, ZZ, the combination of XX and YY, the combination of XX and ZZ, the combination of YY and ZZ, and the combination of XX, YY, and ZZ.

The present inventors conducted a study on a fixing rotating member having a base layer comprising polyimide (PI), a heating layer (conductive layer) on the base layer, and a protective layer comprising polyamide imide (PAI) for protecting the heating layer as a fixing rotating member for use in an electromagnetic induction heating system. The base layer comprising PI is excellent in heat resistance and durability. However, the base layer comprising PI requires burning at high temperatures, and requires a long time for manufacturing thereof. On the other hand, the protective layer comprising PAI can be formed at lower temperatures and for a shorter time as compared with PI. However, PAI is a little inferior in strength to PI. For this reason, PI is applied to the base layer required to have a high strength for sliding with other members, and PAI is applied to the protective layer.

In the process of the study on such a fixing rotating member, cracks and rupture (which will be also hereinafter referred to as "cracks, and the like") may be caused in the heating layer due to a long-term use. The occurrence of cracks and the like in the heating layer can be considered due to the fact that the base layer and the protective layer are different in material from each other.

Namely, it can be considered as follows. PI and PAI are different in temperature dependency of the elastic modulus from each other. PAI largely decreases in elastic modulus under environment of higher temperatures (e.g., 160 to 200° C.) as compared with PI. For this reason, when the fixing rotating member having the foregoing configuration is bent, a tensile stress acts on the heating layer, resulting in the occurrence of cracks and the like.

Under such circumstances, the present inventors conducted a study on the following: on the basis of the invention disclosed in Japanese Patent Application Publication No. 2004-070191, specifically, the thicknesses of the base layer and the protective layer are adjusted to position the neutral axis in the thickness direction of the fixing rotating member at the heating layer. However, even with the fixing rotating member thus obtained, cracks and the like may be caused at the heating layer located in the vicinity of the end in the longitudinal direction orthogonal to the circumferential direction of the fixing rotating member.

Particularly, when the heating layer comprises a plurality of heating rings arranged in the longitudinal direction of the base layer, and extending in the full circumferential direction of the base layer, cracks and the like may be caused at the heating ring located in the vicinity of the end, so that the conductivity of the heating ring may decrease. The decrease in conductivity of the heating ring located in the end region can cause the decrease in temperature of the outer surface of the end region of the fixing rotating member.

Under such circumstances, the present inventors conducted a study on the cause of the occurrence of cracks and the like at the heating layer located in the end region. As a result, the present inventors have presumed that the cause is as follows. When the fixing rotating member is used over a long period, the temperature of the end region in the longitudinal direction of the fixing rotating member increases more than in the central region. As a result, the position of the neutral axis in the end region changes from the position of the neutral axis in the central region, and a tensile stress acts on the heating layer located in the end region.

On the basis of such consideration, a further study was conducted. As a result, the following was found out. The fixing rotating member having the following configuration will not undergo cracks and the like in the heating layer located in the end region, and can generate heat with stability in the entire region in the longitudinal direction of the heating layer even when the temperature of the end region becomes higher than that of the central region.

Configuration

A fixing rotating member comprising:

a first resin layer having an endless shape;

at least one heating layer on an outer circumferential surface of the first resin layer;

a second resin layer on an outer circumferential surface of the heating layer;

an elastic layer on an outer circumferential surface of the second resin layer; and, a surface layer on an outer circumferential surface of the elastic layer, wherein the first resin layer and the second resin layer are different from each other in elastic modulus at a temperature Tc, which is from 160 to 200° C., by at least 10%, and when a temperature of an outer surface in a central region of the fixing rotating member is referred to as Tc, and a temperature of an outer surface in an end region is referred to as Tc+50° C., a neutral axis in a thickness direction of the fixing rotating member is situated in the heating layer or in the second resin layer in the central region and the end region, for the central region and the end region, when a number of the heating layers observed at a cross section in a width direction orthogonal to a circumferential direction of the fixing rotating member is one, the end region is a region from both ends in the width direction up to 0.02×L1 toward a center in the width direction of the heating layer, and the central region is a region from the center up to 0.48×L1 toward both ends, where the L1 is a length from one end to the other end of the heating layer, and when the number of the heating layers observed at a cross section in the width direction orthogonal to the circumferential direction of the fixing rotating member is plural, the end region is a region from both ends in the width direction of a heating layer group comprising the plurality of heating layers up to 0.02×L2 toward the center in the width direction, and the central region is a region from the center up to 0.48×L2 toward the both ends, where the L2 is a length from one end to the other end of the heating layer group.

Specific configurations of a fixing rotating member, a fixing apparatus produced using the same, and an electrophotographic image forming apparatus according to the present disclosure will be described below in detail.

However, sizes, materials, shapes and relative arrangements of components described in this aspect should be appropriately changed according to configurations of members to which the disclosure is applied and various conditions. That is, it is not intended to limit the scope of the disclosure to the following aspects. In addition, in the following description, configurations having the same functions will be denoted with the same reference numerals in the drawings and descriptions thereof may be omitted.

(1) Schematic Outline of Fixing Rotating Member

The fixing rotating member will be described in details by reference to the accompanying drawings.

A fixing rotating member in accordance with one aspect of the present disclosure can be configured as a rotatable member such as an endless belt shape.

The fixing rotating member has a first resin layer having an endless shape, at least one heating layer on the outer circumferential surface of the first resin layer, a second resin layer on the outer circumferential surface of the heating layer, an elastic layer on the outer circumferential surface of the second resin layer, and a surface layer on the outer circumferential surface of the elastic layer. Namely, the heating layer is interposed between the first resin layer and the second resin layer.

The fixing rotating member has a base layer, a heating layer (conductive layer) on the outer circumferential surface of the base layer, a protective layer on the outer circumferential surface of the heating layer, an elastic layer on the outer circumferential surface of the protective layer, and a surface layer on the outer circumferential surface of the elastic layer. Namely, the first resin layer is the base layer, and the second resin layer is the protective layer. The first resin layer and the second resin layer are different in elastic modulus from each other by at least 10% at a temperature Tc (where the temperature Tc is from 160 to 200° C.).

Below, the configuration of each layer will be described in details.

(2) First Resin Layer

The first resin layer has no particular restriction so long as it is the layer comprising at least a resin. The first resin layer is the base layer.

When the fixing rotating member is used for a fixing apparatus of an electromagnetic induction system, the first resin layer is preferably the layer that less changes in physical properties with the heating layer is in a heated state, and keeps a high strength. For this reason, the first resin layer preferably comprises a heat resistant resin as a main component, and is preferably configured of a heat resistant resin. The heat resistant resin is a resin that will not be molten or decomposed at a temperature of, for example, less than 250° C. (preferably less than 300° C.).

The resin comprised in the first resin layer (preferably the resin configuring the first resin layer) preferably comprises at least one selected from the group consisting of polyimide (PI), polyamide imide (PAI), modified polyimide, and modified polyamide imide. More preferable is at least one selected from the group consisting of polyimide and polyamide imide. Out of these, particularly, polyimide is preferable. Incidentally, in the present disclosure, the main component means the component comprised in the largest amount of the components configuring the object (herein, the first resin layer).

Here, examples of modification for modified polyimide and modified polyamide imide include siloxane modification, carbonate modification, fluorine modification, urethane modification, triazine modification, and phenol modification.

The identification of the resin can be performed by, for example, NMR, GC-MASS, or Fourier transform infrared spectroscopy (FT-IR).

The first resin layer can be formed by, for example, the following method.

The surface of a mold having a prescribed diameter is subjected to a mold release treatment, and a solution comprising a resin is applied thereto, thereby forming a coating film. By drying the formed coating film, it is possible to form the first resin layer.

For example, when polyimide is used as a resin, a commercially available polyimide precursor solution, or the like is applied onto the surface of the mold by the immersion method. As a result, a coating film can be formed. After drying the formed coating film, burning is performed for imidization. As a result, a polyimide film can be formed. The formed polyimide film serves as the first resin layer.

In the first resin layer, a filler may be mixed for the heat insulating property or strength improvement.

The first resin layer has an endless belt shape. The thickness of the first resin layer is determined by setting of the neutral axis described later, and is preferably, for example, set at 10 to 100 μm, and is more preferably set at 20 to 60 μm. By setting the thickness of the first resin layer within the foregoing range, it is possible to achieve both the strength and the flexibility at a high level.

Further, on the surface opposite to the side opposed to the heating layer of the first resin layer, for example, a layer for preventing the abrasion of the inner circumferential surface of the fixing belt in the case where the inner circumferential surface of the fixing belt comes in contact with other members, or a layer for improving the sliding property with other members can be provided.

Incidentally, the outer circumferential surface of the first resin layer may be subjected to a surface roughening treatment such as blasting, or a reforming treatment such as UV, Plasma, or chemical etching in order to improve the adhesiveness with the heating layer and the wettability.

(3) Heating Layer

The heating layer is the layer that generates heat at the time of causing a current to flow through the fixing rotating member. The heating layer is interposed between the first resin layer and the second resin layer.

With the heating principle by induction heating using an excitation coil, when an alternating current is supplied to the excitation coil arranged in the vicinity of the fixing rotating member, the magnetic field is induced, and the magnetic field causes generation of a current in the heating layer of the fixing rotating member, so that heat is generated by Joule's heat. Namely, the heating layer is a conductive layer.

As the material for the heating layer, the one that has a low volume resistivity, and is less likely to be oxidized is preferable. Examples thereof may include gold, silver, copper, and aluminum. The heating layer preferably comprises silver. The heating layer may comprise other metals than the foregoing to such an extent as not to impair the effects of the present disclosure.

The maximum thickness of the heating layer is preferably set at 5 μm or less. By setting the maximum thickness of the heating layer at 5 μm or less, it is possible to sufficiently reduce the heat capacity of the heating layer, and it becomes possible to more shorten the time for the heating layer to reach a desired temperature by electromagnetic induction.

Figure 2:
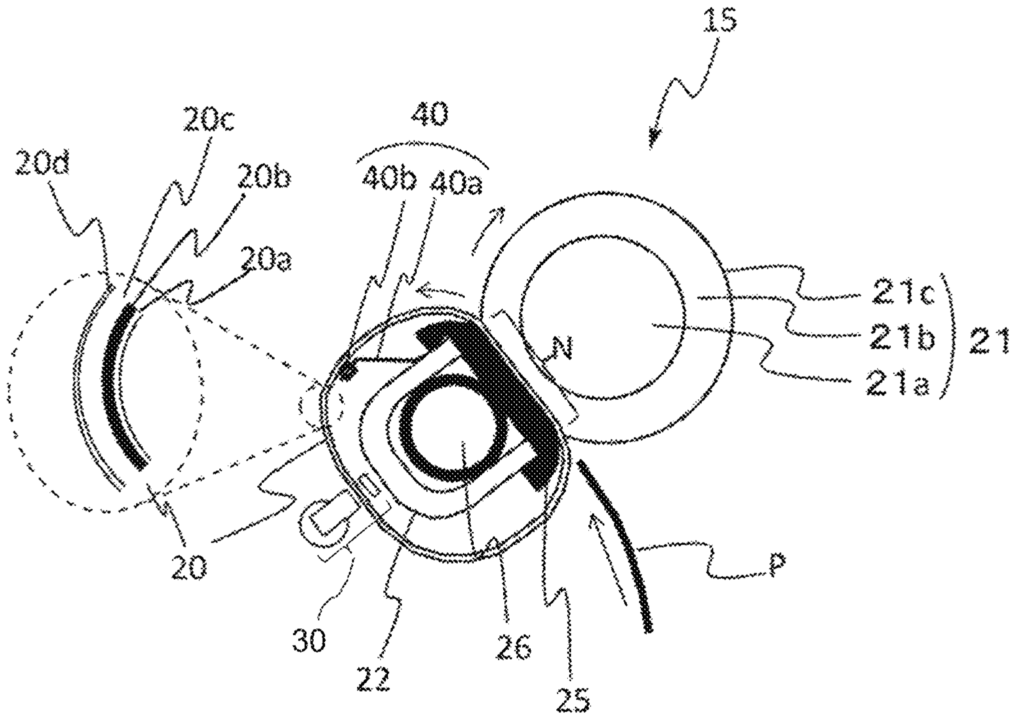
FIG. 2 is a schematic view showing a cross sectional configuration of a fixing apparatus in accordance with an embodiment.

As shown in FIG. 2, a fixing rotating member 20 is rotatively driven while being pressurized by a film guide 25 and a pressure roller 21. For every rotation thereof, the fixing rotating member 20 is pressurized/deformed at a nip portion N, to receive a stress. Also when the fixing rotating member is thus subjected to repeated bending over a long period, setting of the maximum thickness of the heating layer at 5 μm or less improves the flexibility of the fixing rotating member, which can make fatigue fracture less likely to be caused. This is because when the heating layer is pressurized and deformed to follow the shape of the curved surface of the film guide 25, the internal stress acting on the heating layer becomes smaller with a decrease in thickness of the heating layer.

The maximum thickness of the heating layer is more preferably 3 μm or less. The lower limit of the thickness of the heating layer has no particular restriction. From the viewpoint of keeping the durability, the lower limit is preferably 1 μm or more. Accordingly, the maximum thickness of the heating layer is preferably 1 to 5 μm, and in particular preferably 1 to 3 μm.

The maximum thickness of the heating layer in the fixing rotating member can be measured, for example, in the following manner.

Samples each 5 mm long and 5 mm wide, and with a thickness of the total thickness of the fixing rotating member are collected from the fixing rotating member, one sample from each of 6 sites of the fixing rotating member. For the resulting 6 samples, the cross section in the circumferential direction of the fixing rotating member is exposed by a cross section polisher (trade name: SM09010, manufactured by JEOL Ltd.).

Subsequently, the exposed cross section of the heating layer is observed at an acceleration voltage of 3 kV, and a working distance of 2.9 mm, and at a magnification of 10000 times by a scanning electron microscope (SEM) (trade name: JSM-F100, manufactured by JEOL Ltd.), thereby obtaining an image with a width of 13 μm and a height of 10 μm. For the heating layer in the resulting image, parallel lines are drawn at the site located closest to the first resin layer side and the site located closest to the second resin layer side opposed thereto, and the distance between the parallel lines is assumed to be the maximum thickness in the image. The arithmetic average value of the maximum thicknesses of the 6 samples was defined as the maximum thickness of the heating layer. Incidentally, the parallel lines were assumed to be drawn with reference to the surface opposed to the heating layer of the first resin layer in the observation region.

Figure 3:
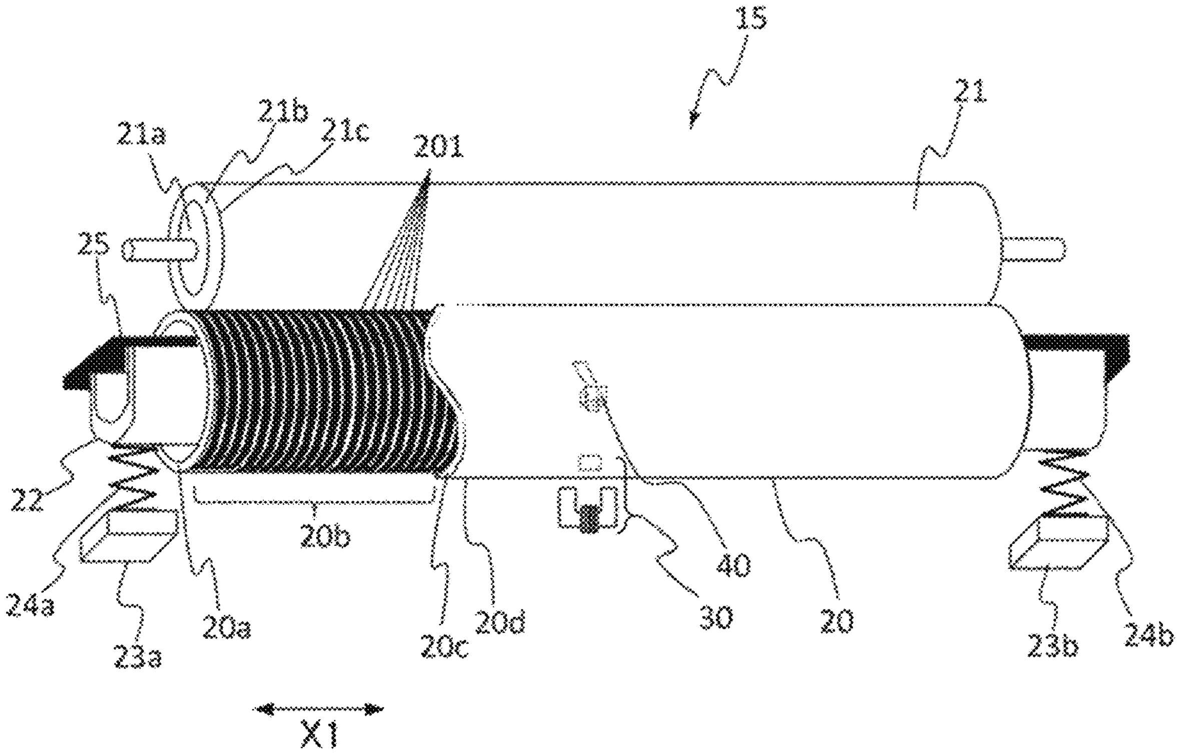
FIG. 3 is a perspective view showing a cross sectional configuration of a fixing apparatus in accordance with an embodiment.

The heating layer extends in the circumferential direction of the outer circumferential surface of the first resin layer. The heating layer may only be capable of heating at the time of passing a current, and may include a prescribed pattern. Particularly, as shown in FIG. 3, it is preferably configured such that a plurality of heating rings 201 each formed in a ring shape are formed while being electrically divided in the rotation axis direction of the fixing rotating member. Namely, the heating layer can be configured of a plurality of heating rings 201 separated from each other, and arranged adjacent to each other.

The heating rings 201 each formed in a ring shape are preferably formed at regular intervals along the rotation axis direction of the fixing rotating member. For example, an ink comprising a silver nanoparticle is applied in a pattern form onto the outer circumferential surface of the substrate using an ink jet method, thereby forming a ring-shaped coating film comprising a silver nanoparticle. The coating film can be burned, and as a result, a heating layer formed of heating rings comprising silver can be formed.

When the heating layer comprises a plurality of heating rings, the width of the heating ring is preferably 100 μm or more, and more preferably 200 μm or more from the viewpoint of manufacturability and the heating property. From the viewpoints of the uneven heating and the safety, the thickness is preferably 1000 μm or less, and more preferably 700 μm or less. The width of the ring is for example, preferably 100 to 1000 μm, and more preferably 200 to 700 μm.

The interval between the rings of the heating layer is preferably 50 μm or more, and more preferably 100 μm or more from the viewpoints of the manufacturability and the heating property. From the view point of the uneven heating, the interval is preferably 400 μm or less, and more preferably 300 μm or less. The interval between the rings is, for example, preferably 50 to 300 μm, and more preferably 100 to 300 μm.

The heating layer may be formed as a heating layer group comprising a plurality of heating layers. The heating layer group is formed of, for example, a plurality of heating layers formed spaced apart from each other on the outer circumferential surface of the first resin layer. Namely, on the outer circumferential surface of the first resin layer, there may be a region where no heating layer is formed.

(4) Second Resin Layer

The second resin layer is present on the outer circumferential surface of the heating layer. The second resin layer is a protective layer. The second resin layer protects the heating layer, and has functions of oxidation prevention of the heating layer, ensuring of insulation, and strength improvement.

The resin configuring the second resin layer is preferably a resin that less changes in physical properties with the heating layer is in a heated state, and can keep the high strength. For this reason, the second resin layer preferably comprises a heat resistant resin as the main component, and preferably comprises a heat resistant resin. The heat resistant resin is a resin that will not be molten or decomposed at a temperature of, for example, less than 250° C. (preferably less than 300° C.).

The resin configuring the second resin layer preferably comprises at least one selected from the group consisting of polyimide (PI), polyamide imide (PAI), modified polyimide, and modified polyamide imide. More preferably, the resin comprises at least one selected from the group consisting of polyimide and polyamide imide. Out of these, particularly, polyamide imide is preferable. As for the modification, the same as those described in connection with the first resin layer applies.

The kind of the resin can be identified by, for example, the foregoing method.

The second resin layer can be formed by, for example, the following method.

On the outer circumferential surface of the heating layer, a solution comprising a resin is applied, thereby forming a coating film. The formed coating film can be burned, and as a result, the second resin layer can be formed. For example, when polyamide imide is used as a resin, a coating film can be formed by applying a commercially available polyamide imide solution onto the heating layer.

The application method of the solution has no particular restriction, and, for example, ring coating can be used. Further, the thickness of the second resin layer is not required to be constant, and may be changed locally. For example, in the direction orthogonal to the circumferential direction of the fixing rotating member, and along the heating layer, the second resin layer may be set thick at the end part, and the second resin layer may be set thinner at the central part than at the end part. The thickness of the resin layer can be changed by, for example, control of the total liquid amount of the ring coating and the passing speed thereof.

The second resin layer may comprise a thermally conductive filler from the viewpoint of the thermal conductivity. By improving the thermal conductivity, it is possible to transmit the heat generated at the heating layer to the outer surface of the fixing rotating member with efficiency.

The thickness of the second resin layer is determined by setting of the neutral axis described later, and is preferably 10 to 100 μm, and more preferably 20 to 80 μm.

Then, a description will be given to the neutral axis in the thickness direction in the fixing rotating member.

The neutral axis denotes the position at which the tensile stress and the compression stress are in balance in the cross section when a bending moment occurs in the member. The position of the neutral axis is determined by the thickness and the elastic modulus of each layer configuring the member.

Figure 7:
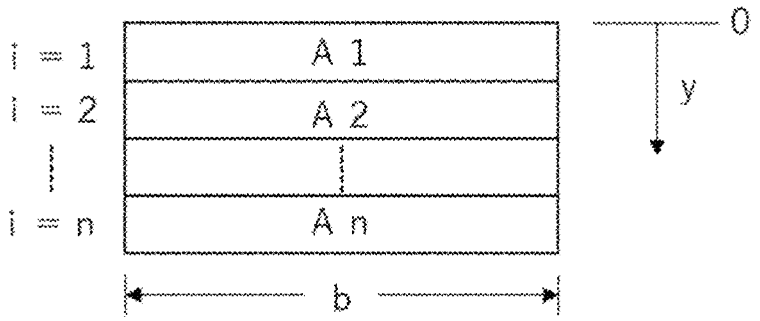
FIG. 7 is a view illustrating the calculation method of the neutral axis in the fixing rotating member in accordance with an embodiment.

The belt-shaped member comprising n layers as shown in FIG. 7 is assumed. Where with reference to the surface of the belt-shaped member, y represents the $$y_0 = \sum\left(E_i \int_{A_i} y\, dA_i\right) / \sum(E_i A_i) \qquad \text{(Formula 1)}$$

distance in the thickness direction, Ai represents the cross sectional area of the i-th layer from the surface, bi represents the width of this layer, and Ei represents the elastic modulus, the distance y0 between the surface of the belt-shaped member and the neutral axis can be defined as the following formula (1).

Herein, considering per unit width (b=1), it results that cross sectional area Ai from surface to i-th layer is to be thickness of from surface to i-th layer. Namely, it results that dAi=dyi, and the distance y0 between the surface of the belt-shaped member and the neutral axis is expressed by the following formula (2).

$$y_0 = \sum\left(E_i \int_{A_i} y\, dy_i\right) / \sum(E_i y_i) \qquad \text{(Formula 2)}$$

As described above, the fixing rotating member is pressurized/deformed, and receives a stress at the nip portion N each time when rotatively driven. When a tensile stress or a compression stress continues to be applied thereto due to long-time durability test use, or the like, cracks or permanent deformation becomes more likely to be caused at the heating layer. As a result, the resistance of the heating layer increases, and it becomes impossible to generate heat by electromagnetic induction heating effectively.

The neutral axis in the thickness direction of the fixing rotating member is controlled so as to be located in the heating layer. As a result, the tensile stress and the compression stress are in balance in the heating layer, and the tensile and compression stresses applied onto the heating layer are minimized. In consequence, the phenomenon leading to an increase in resistance such as cracks or permanent deformation also becomes less likely to be caused, resulting in an improvement of the durability of the fixing rotating member.

Further, the cracks or permanent deformation tends to be caused particularly when the heating layer is applied with a tensile stress. For this reason, even when the neutral axis is not located in the heating layer, setting of the stress applied to the heating layer on the compression side can more suppress the reduction of the durability than when a tensile stress is applied thereto.

Specifically, by allowing the neutral axis to be located in the second resin layer on the outer circumferential surface of the heating layer, it is possible to set the stress applied to the heating layer on the compression side, and to more improve the durability than when a tensile stress is applied thereto.

Herein, the fixing rotating member varies in temperature of the outer surface between in the central region that is the paper passing portion through which a recording material passes and in the end region that is the non-paper passing portion through which a recording material does not pass during use. When the recording material passes through the fixing apparatus, the central region is deprived of heat by the passing recording material, and hence the temperature of the outer surface becomes about 160 to 200° C. On the other hand, through the end region, the recording material does not pass. For this reason, the temperature is kept, so that the temperature of the outer surface becomes higher than that of the central region by about 50° C.

For this reason, when the first resin layer and the second resin layer are formed using resins having different temperature dependencies of the elastic modulus, even with a configuration in which the neutral axis is located in the heating layer or in the second resin layer in the central region, the position of the neutral axis changes in the end region where the temperature of the outer surface is higher than Tc by about 50° C., so that a tensile stress may be applied to the heating layer.

Below, a description will be given to the temperature dependency of the elastic modulus and the neutral axis.

Figure 8:
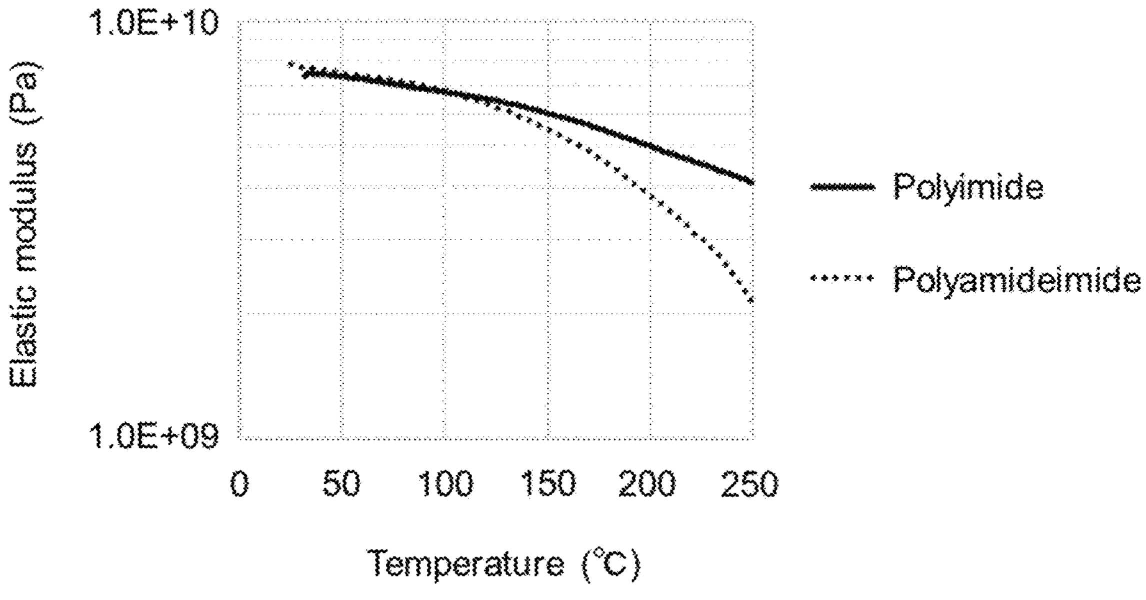
FIG. 8 is a view showing the temperature dependency of the elastic moduli of polyimide and polyamide imide in accordance with an embodiment.

FIG. 8 is a view showing the temperature dependencies of the elastic modulus of polyimide and polyamide imide. Polyimide and polyamide imide are different in temperature dependency of the elastic modulus from each other, and polyamide imide has a lower elastic modulus in a high temperature region. Further, the difference in elastic modulus therebetween increases with an increase in temperature.

For example, when different materials are used, for example, polyimide for the first resin layer, and polyamide imide for the second resin layer, a difference is caused in elastic modulus between the first resin layer and the second resin layer in the central region and the end region of the fixing rotating member. For this reason, even when in the central region, the neutral axis is controlled so as to be located in the heating layer or in the second resin layer, the position of the neutral axis changes in the end region where the temperature of the outer surface is high.

Incidentally, the fixing rotating member has an elastic layer and a surface layer described later. The elastic layer and the surface layer are normally low in elastic modulus, and hardly affects the position of the neutral axis. Namely, the position of the neutral axis in the thickness direction of the fixing rotating member can be controlled by the materials and the thicknesses of the first resin layer, the heating layer, and the second resin layer. Below, a description will be given to the control method of the position of the neutral axis in the thickness direction of the fixing rotating member.

For example, a consideration will be given to the case where as the heating layer, silver with a thickness of 2.5 μm, and an elastic modulus of 10 GPa is used, the first resin layer comprises polyimide, and the second resin layer comprises polyamide imide.

When polyimide with a thickness of 40 μm is used as the first resin layer, the elastic modulus at 180° C. corresponding to the temperature of the outer surface during use of the central region of the fixing rotating member is 5.4 GPa. On the other hand, polyamide imide comprised in the second resin layer has an elastic modulus at 180° C. of 4.6 GPa. In this case, when calculation is performed on the basis of the formula (2), by setting the thickness of the second resin layer at 47 μm, it is possible to allow the neutral axis in the thickness direction to be located in the heating layer.

However, as described above, the central region of the fixing rotating member, normally comes in contact with passing paper, so that heat transfers to the paper. On the other hand, for the end region, the frequency of contact of paper may be less as compared with the central region. In the end region with a less contact frequency of paper as compared with the central region, heat builds up, so that the temperature of the outer surface may increase up to, for example, about 230° C. The elastic modulus of polyimide at a temperature of 230° C. is 4.5 GPa. In contrast, the elastic modulus of polyamide imide at a temperature of 230° C. is 2.9 GPa. As a result, the value of $y0$ determined by the formula (2) increases. Namely, the neutral axis in the end region is located closer to the inner surface side (first resin layer side) than the neutral axis in the central region with respect to the heating layer. As a result, a tensile stress is applied to the heating layer located in the end region, so that cracks and the like become more likely to be caused.

When calculation is performed on the basis of the formula (2), by setting the thickness of the second resin layer (the layer comprising polyamide imide) in the end region at 62 μm, it is possible to allow the neutral axis in the end region to be located in the heating layer. Namely, by forming a configuration in which the thickness of the second resin layer varies between in the central region and in the end region, the neutral axis can be located in the heating layer. As a result, it becomes possible to improve the durability as the whole fixing rotating member.

As described above, the first resin layer and the second resin layer are different in elastic modulus at a temperature Tc from each other by at least 10%. The temperature Tc falls within the range of from 160° C. to 200° C., and is the temperature corresponding to the temperature of the outer surface of the central region during use of the fixing rotating member. The temperature Tc can fall within the range of, for example, from 165 to 195° C., and can fall within the range of from 170 to 190° C. The fact that the first resin layer and the second resin layer are different in elastic modulus at the temperature Tc from each other by at least 10% is the configuration on the assumption that the position of the neutral axis in the thickness direction of the fixing rotating member is required to be considered.

The difference in elastic modulus between the first resin layer and the second resin layer at the temperature Tc is preferably 10 to 30%. Further, the difference in elastic modulus between the first resin layer and the second resin layer at a temperature of Tc+50° C. is preferably 20 to 50%.

The present inventors found that even when the first resin layer and the second resin layer are different in the elastic modulus at the temperature Tc from each other, by allowing the neutral axis to be located as follows, it is possible to keep the durability of the fixing rotating member.

Namely, when Tc represents the temperature of the outer surface of the fixing rotating member, and Tc+50° C. represents the temperature of the outer surface in the end region, the durability of the fixing rotating member can be kept by forming a configuration in which the neutral axis in the thickness direction of the fixing rotating member is located in the heating layer or in the second resin layer in the central region and the end region.

Figure 9A:
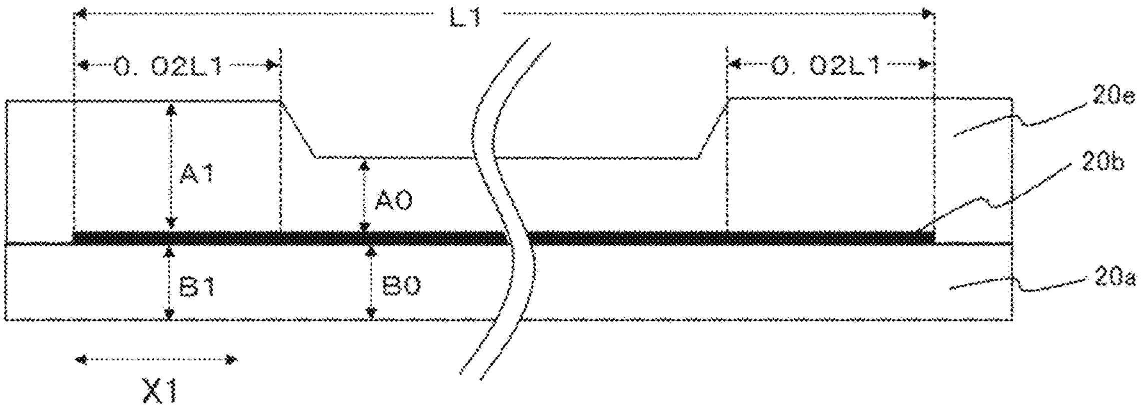
FIGS. 9A and 9B are each a schematic view showing the cross sectional configuration in the longitudinal direction of a fixing rotating member in accordance with an embodiment.

FIG. 9A is a cross sectional block view showing an example of the fixing rotating member in which the number of the heating layers **20*b* observed in a cross section in the width direction orthogonal to the circumferential direction of the fixing rotating member is one. The heating layer 20*b* is interposed between the first resin layer 20*a* and the second resin layer 20*e***. The region from both ends in the width direction of the heating layer up to 0.02×L1 toward the center in the width direction is the end region, where L1 represents the length from one end toward the other end of the heating layer. Further, the region from the center up to 0.48×L1 toward both the ends is the central region.

The central region is the region corresponding to the paper passing portion, and the end region is the region corresponding to the non-paper passing portion.

Figure 9B:
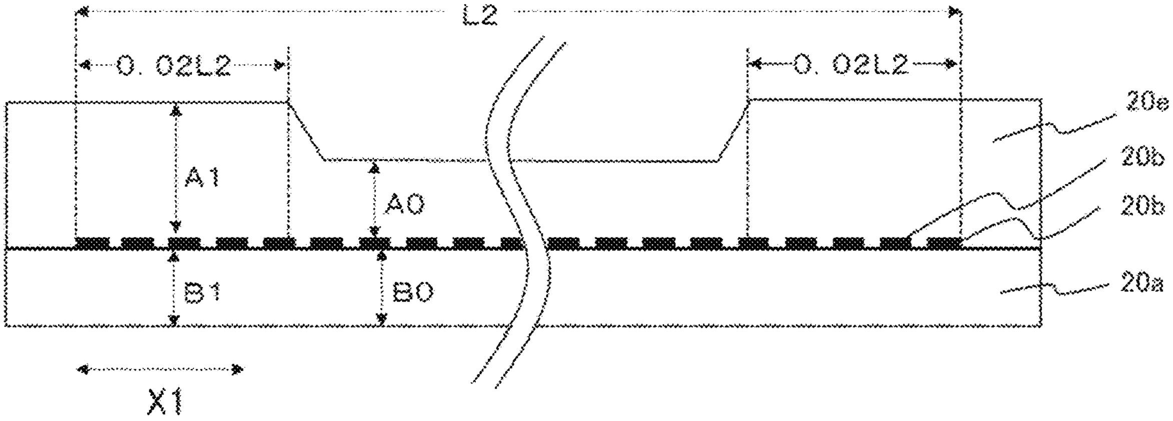

As described above, the heating layer may be formed as the heating layer group comprising a plurality of heating layers. FIG. 9B is a cross sectional block view showing an example of the fixing rotating member in which the heating layer **20*b* is formed as the heating layer group comprising a plurality of heating layers in the cross section in the width direction orthogonal to the circumferential direction of the fixing rotating member. The heating layer group is interposed between the first resin layer 20*a* and the second resin layer 20*e***. In such an aspect, the region from both ends in the width direction of the heating layer group up to 0.02×L2 toward the center in the width direction is defined as the end region, where L2 represents the length from one end toward the other end of the heating layer group comprising a plurality of heating layers. Further, the region from the center up to 0.48×L2 toward both the ends is defined as the central region.

As described above, the position of the neutral axis in the thickness direction can be controlled by the material and the thickness of each layer. For example, by changing the thickness of a specific layer in the central region and the end region, or other processes, it is possible to control so that in the central region and the end region, the neutral axis is located in the heating layer or in the second resin layer. The neutral axis in the thickness direction of the fixing rotating member being located in the heating layer or in the second resin layer can be confirmed by the method described later.

In the central region, A0 represents the average thickness of the second resin layer, and B0 represents the average thickness of the first resin layer. In the end region, A1 represents the average thickness of the second resin layer, and B1 represents the average thickness of the first resin layer. Further, the temperature of the outer surface in the central region of the fixing rotating member is assumed to be Tc, and the temperature of the outer surface in the end region is assumed to be Te. Tc falls within the range of from 160° C. to 200° C., and Te is Tc+50° C.

EA (Tc) represents the elastic modulus of the second resin layer at the temperature Tc, and EB (Tc) represents the elastic modulus of the first resin layer at the temperature Tc. Further, EA (Te) represents the elastic modulus of the second resin layer at the temperature Te, and EB (Te) represents the elastic modulus of the first resin layer at the temperature Te.

In this case, the fixing rotating member preferably satisfies the following formulae (3) to (6).

$$A0 \geq EB(Tc)/EA(Tc) \times B0 \quad \text{Formula (3)}$$

$$A1 \geq EB(Te)/EA(Te) \times B1 \quad \text{Formula (4)}$$

$$A0 \times EA(Tc) \leq 1.2 \times B0 \times EB(Tc) \quad \text{Formula (5)}$$

$$A1 \times EA(Tc) \leq 1.2 \times B1 \times EB(Te) \quad \text{Formula (6)}$$

Satisfying the formula (3) indicates that in the central region, the stresses received by the first resin layer and the second resin layer are in balance, the neutral axis is located in the interposed heating layer, and the stress applied to the heating layer is minimized, or the neutral axis is located in the second resin layer, and the heating layer receives a compression stress. Further, satisfying the formula (4) indicates that in the end region, the stresses received by the first resin layer and the second resin layer are in balance, the neutral axis is located in the interposed heating layer, and the stress applied to the heating layer is minimized, or the neutral axis is located in the second resin layer, and the heating layer receives a compression stress.

Accordingly, by satisfying the formulae (3) and (4), it is possible to allow the neutral axis in the thickness direction of the fixing rotating member in the central region and the end region to be located in the heating layer or in the second resin layer. As a result, the durability of the fixing rotating member can be improved.

On the other hand, when the second resin layer becomes too thick, the compression stress applied to the heating layer becomes too large. For this reason, the durability becomes more likely to be reduced. For this reason, the fixing rotating member preferably satisfies the following formulae (5) and (6).

$$A0 \times EA(Tc) \leq 1.2 \times B0 \times EB\ (Tc) \quad \text{Formula (5)}$$

$$A1 \times EA(Te) \leq 1.2 \times B1 \times EB\ (Te) \quad \text{Formula (6)}$$

Satisfying the formula (5) means that in the central region, the neutral axis located in the second resin layer is not excessively separated from the first resin layer, and the compression stress applied to the heating layer does not become too large. Further, satisfying the formula (6) means that in the end region, the neutral axis located in the second resin layer is not excessively separated from the first resin layer, and the compression stress applied to the heating layer does not become too large. Namely, satisfying the formulae (5) and (6) indicates that in the central region and the end region, the thickness of the second resin layer is proper. As a result, the compression stress applied to the heating layer is not too large, so that the durability can be improved.

The EB (Tc) has no particular restriction, and is preferably 4.0 to 10.0 GPa. Further, the EA (Tc) has no particular restriction, and is preferably 4.0 to 10.0 GPa. The EB (Tc) is preferably larger than the EA (Tc).

The EB (Te) has no particular restriction, and is preferably 3.0 to 9.0 GPa. Further, the EA (Te) has no particular restriction, and is preferably 3.0 to 9.0 GPa. The EB (Te) is preferably larger than the EA (Te).

The average thickness A0 of the second resin layer in the central region has no particular restriction, and is preferably 20 to 80 μm, and more preferably 30 to 70 μm. Further, the average thickness B0 of the first resin layer in the central region has no particular restriction, and is preferably 10 to 70 μm, and more preferably 20 to 60 μm.

The average thickness A1 of the second resin layer in the end region has no particular restriction, and is preferably 10 to 100 μm, and more preferably 40 to 100 μm. Further, the average thickness B1 of the first resin layer in the end region has no particular restriction, and is preferably 10 to 70 μm, and more preferably 20 to 60 μm.

The total thickness of the first resin layer, the heating layer, and the second resin layer is preferably 150 μm or less, and more preferably 100 μm or less in the central region. Further, in the end region, the total thickness is preferably 200 μm or less, and more preferably 150 μm or less.

Figure 6:
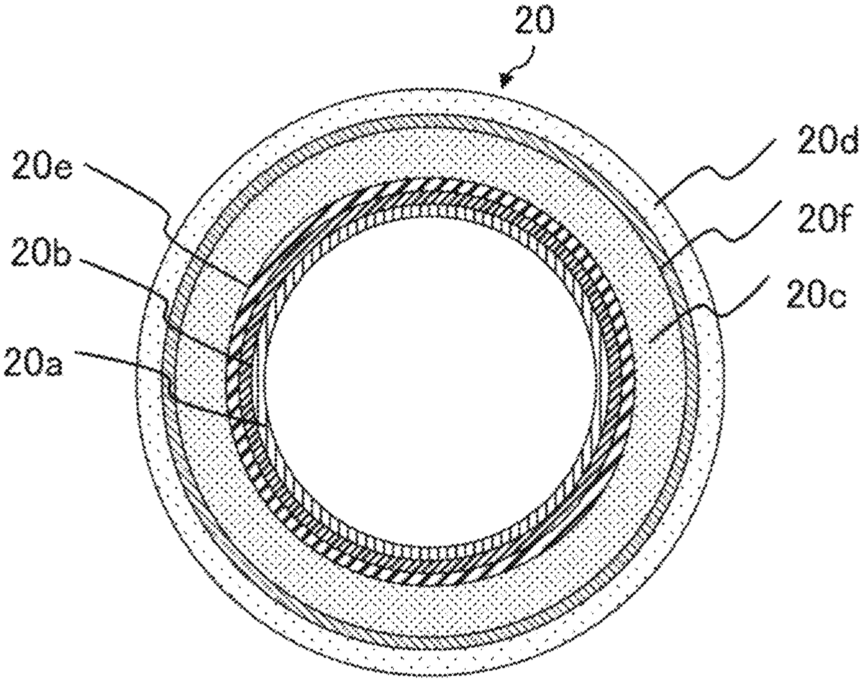
FIG. 6 is a cross sectional block view of a fixing rotating member in accordance with an embodiment.

FIG. 6 is a cross sectional view in the circumferential direction of the fixing rotating member. The fixing rotating member has a first resin layer 20*a*, a heating layer 20*b* on the outer surface of the first resin layer 20*a*, and a protective layer 20*e* on the outer surface of the heating layer 20*b*. The first resin layer 20*a* is the first resin layer, the heating layer 20*b* is the heating layer, and the protective layer 20*e* is the second resin layer. Further, the fixing rotating member has an elastic layer 20*c* on the outer circumferential surface of the second resin layer 20*e* and a surface layer (release layer) 20*d* on the outer circumferential surface of the elastic layer 20*c*. Further, if required, an adhesive layer 20*f* can be comprised between the elastic layer 20*c* and the surface layer 20*d*.

(5) Elastic Layer

The fixing rotating member has the elastic layer 20*c* on the outer surface of the second resin layer 20*e*.

The elastic layer 20*c* is the layer for imparting the flexibility to the fixing rotating member in order to ensure a fixing nip at the fixing apparatus. Incidentally, when the fixing rotating member is used as a heating member to come in contact with a toner on paper, the elastic layer 20*c* also functions as the layer for imparting the flexibility such that the surface of the heating member can follow the unevenness of the paper.

The elastic layer 20*c* comprises, for example, rubber as a matrix and particles dispersed in the rubber. More specifically, the elastic layer 20*c* preferably comprises rubber and a thermally conductive filler, and is preferably formed of a cured material obtained by curing a composition comprising at least a rubber raw material (a base polymer, a cross-linking agent, etc.) and a thermally conductive filler.

The elastic layer 20*c* preferably comprises silicone rubber. From the viewpoint of exhibiting the function of the elastic layer 20*c*, the elastic layer 20*c* preferably comprises a silicone rubber cured product comprising a thermally conductive particle, and more preferably comprises a cured product of an addition curable silicone rubber composition.

The silicone rubber composition can comprise, for example, a thermally conductive particle, a base polymer, a crosslinking agent, and a catalyst, and, if required, an additive. Since the silicone rubber composition is often a liquid, a thermally conductive filler tends to be dispersed therein, and by adjusting the crosslinkability thereof according to the kind and the addition amount of the thermally conductive filler, the elasticity of the elastic layer 20*c* to be manufactured becomes more likely to be adjusted.

The matrix bears a function of exhibiting the elasticity at the elastic layer 20*c*. The matrix preferably comprises silicone rubber from the viewpoint of exhibiting the function of the elastic layer 20*c*. The silicone rubber has a high heat resistance capable of keeping the flexibility even under high temperature environment of about 230° C. as with the non-paper passing portion region, and hence is preferable. As the silicone rubber, for example, a cured product of an addition curable liquid silicone rubber composition described later can be used. The elastic layer 20*c* can be formed by applying/heating the liquid silicone rubber composition with a known method.

The liquid silicone rubber composition comprises generally the following components (a) to (d).

Component (a): organopolysiloxane having an unsaturated aliphatic group;

Component (b): organopolysiloxane having active hydrogen bonded to silicon;

Component (c): catalyst;

Component (d): thermally conductive filler

Hereinafter, respective components will be described.

Component (a)

Organopolysiloxane having an unsaturated aliphatic group is organopolysiloxane having an unsaturated aliphatic group such as a vinyl group, and examples thereof may include those shown in the following structural formulae (1) and (2).

(1)

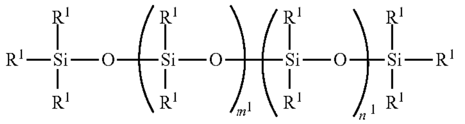

In structural formula (1), $m^1$ represents an integer of 0 or more and $n^1$ represents an integer of 3 or more. $R^1$'s each independently represent a monovalent unsubstituted or substituted hydrocarbon group containing no unsaturated aliphatic group, and at least one of $R^1$'s represents a methyl group. $R^2$'s each independently represent an unsaturated aliphatic group.

(2)

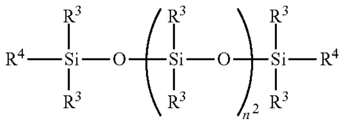

In structural formula (2), $n^2$ represents a positive integer. $R^3$'s each independently represent a monovalent unsubstituted or substituted hydrocarbon group containing no unsaturated aliphatic group, and at least one of $R^3$'s represents a methyl group. $R^4$'s each independently represent an unsaturated aliphatic group.

Examples of monovalent unsubstituted or substituted hydrocarbon groups containing no unsaturated aliphatic group that can be represented by $R^1$ and $R^3$ in structural formulae (1) and (2) include the following groups.

Unsubstituted hydrocarbon group alkyl group (for example, methyl group, ethyl group, propyl group, butyl group, pentyl group, hexyl group or the like). Aryl groups (for example, phenyl group or the like).

Substituted hydrocarbon group substituted alkyl group (for example, chloromethyl group, 3-chloropropyl group, 3,3,3-trifluoropropyl group, 3-cyanopropyl group, 3-methoxypropyl group or the like).

Organopolysiloxanes represented by structural formulae (1) and (2) have at least one methyl group directly bonded to a silicon atom that forms a chain structure. In consideration of ease of synthesis and handling, 50% or more of each of $R^1$ and $R^3$ is preferably a methyl group and all $R^1$ and $R^3$ are more preferably a methyl group.

Further, examples of the unsaturated aliphatic group that can be expressed by $R^2$ and $R^4$ in the structural formulae (1) and (2) may include the following groups.

A vinyl group, an allyl group, a 3-butenyl group, a 4-pentenyl group, and a 5-hexenyl group or the like.

Among these groups, both $R^2$ and $R^4$ are preferably a vinyl group because they are easy to synthesize and handle and are inexpensive, and easily undergo a cross-linking reaction.

In consideration of moldability, the viscosity (dynamic viscosity) of the component (a) is preferably 1,000 to 50,000 $mm^2/s$. If the viscosity is lower than 1,000 $mm^2/s$, it becomes difficult to adjust the hardness to the hardness required for the elastic layer 20*c*, and if the viscosity is higher than 50,000 $mm^2/s$, the viscosity of the composition becomes too high and coating becomes difficult. The viscosity (dynamic viscosity) can be measured using a capillary viscometer, a rotational viscometer or the like based on JIS Z 8803:2011.

The amount of the component (a) added based on the liquid silicone rubber composition used for forming the elastic layer 20*c* is preferably 55 volume % or more in consideration of durability and 65 volume % or less in consideration of heat transfer.

Component (b)

The organopolysiloxane having active hydrogen bonded to silicon functions as a cross-linking agent that reacts with the unsaturated aliphatic group of the component (a) under an action of a catalyst to form a cured silicone rubber.

As the component (b), any organopolysiloxane having Si—H bonds can be used. Particularly, in consideration of the reactivity with the unsaturated aliphatic group of the component (a), those having an average of 3 or more hydrogen atoms bonded to a silicon atom in one molecule are preferably used.

Specific examples of components (b) include linear organopolysiloxanes represented by the following structural formula (3) and cyclic organopolysiloxanes represented by the following structural formula (4).

(3)

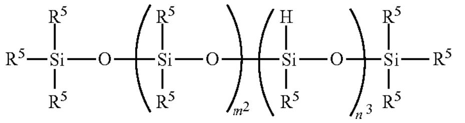

In structural formula (3), $m^2$ represents an integer of 0 or more and $n^3$ represents an integer of 3 or more. $R^5$'s each independently represent a monovalent unsubstituted or substituted hydrocarbon group containing no unsaturated aliphatic group.

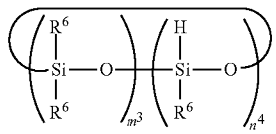

(4)

In structural formula (4), $m^3$ represents an integer of 0 or more and $n^4$ represents an integer of 3 or more. $R^6$'s each independently represent a monovalent unsubstituted or substituted hydrocarbon group containing no unsaturated aliphatic group.

Examples of monovalent unsubstituted or substituted hydrocarbon groups containing no unsaturated aliphatic group that can be represented by $R^5$ and $R^6$ in structural formulae (3) and (4) include the same groups as $R^1$ in structural formula (1) described above. Among these, 50% or more of each of $R^5$ and $R^6$ is preferably a methyl group and all $R^5$ and $R^6$ are more preferably a methyl group because they are easy to synthesize and handle and excellent heat resistance is easily obtained.

Component (c)

Examples of catalysts used for forming silicone rubber include a hydrosilylation catalyst for promoting the curing reaction. As the hydrosilylation catalyst, for example, known substances such as a platinum compound and a rhodium compound can be used. The amount of the catalyst added can be appropriately set and is not particularly limited.

Component (d)

Examples of thermally conductive fillers include metals, metal compounds, and carbon fibers or the like. Highly thermally conductive fillers are more preferable, and specific examples thereof comprise the following materials.

Metallic silicon (Si), silicon carbide (SiC), silicon nitride ($Si_3N_4$), boron nitride (BN), aluminum nitride (AlN), alumina ($Al_2O_3$), zinc oxide (ZnO), magnesium oxide (MgO), silica ($SiO_2$), copper (Cu), aluminum (Al), silver (Ag), iron (Fe), nickel (Ni), vapor-grown carbon fibers, PAN (polyacrylonitrile)-based carbon fibers, pitch-based carbon fibers or the like.

These fillers may be used alone or two or more thereof may be used in combination. In consideration of handling and dispersibility, the average particle size of the filler is preferably 1 to 50 μm. In addition, as the shape of the filler, spherical, pulverized, acicular, plate-like, and whisker-like shapes are used.

Particularly, in consideration of dispersibility, the filler is preferably spherical. In addition, at least one of reinforcing fillers, heat-resistant fillers and colored fillers may be added.

(6) Adhesive Layer

The fixing rotating member may have the adhesive layer 20*f* for adhering the surface layer 20*d* to be described below on the outer surface of the elastic layer 20*c*.

The adhesive layer 20*f* is a layer for adhering the elastic layer 20*c* and the surface layer 20*d*. The adhesive used in the adhesive layer 20*f* is not particularly limited and any appropriately selected from among known adhesives is used. However, in consideration of ease of handling, it is preferable to use an addition-curable silicone rubber to which a self-adhesive component is added.

The adhesive may comprise, for example, a self-adhesive component, an organopolysiloxane having a plurality of unsaturated aliphatic groups represented by vinyl groups in the molecular chain, a hydrogen organopolysiloxane, and a platinum compound as a cross-linking catalyst. When the adhesive applied to the surface of the elastic layer 20*c* is cured according to an addition reaction, the adhesive layer 20*f* that causes the surface layer 20*d* to be adhered to the elastic layer 20*c* can be formed.

Examples of self-adhesive components include the following components.

Silanes having at least one, and preferably 2 or more functional groups selected from the group consisting of alkenyl groups such as a vinyl group, a (meth)acryloxy group, a hydrosilyl group (SiH group), an epoxy group, an alkoxysilyl group, a carbonyl group, and a phenyl group.

Organosilicon compounds such as cyclic or linear siloxanes having from 2 to 30 silicon atoms, and preferably from 4 to 20 silicon atoms.

Non-silicon (that is, comprising no silicon atoms in the molecule) organic compounds that may comprise oxygen atoms in the molecule. However, compounds comprise from 1 to 4 and preferably from 1 to 2 aromatic rings such as a phenylene structure with a valency of from 1 to 4 and preferably from 2 to 4 in one molecule. In addition, compounds comprise at least one, and preferably, from 2 to 4 functional groups (for example, alkenyl group, (meth)acryloxy group) that can contribute to a hydrosilylation addition reaction in one molecule.

The self-adhesive components may be used alone or two or more thereof may be used in combination. In addition, in order to adjust viscosity and secure heat resistance, a filler component can be added to the adhesive within the scope of the gist of the present disclosure. Examples of filler components include the following components.

Silica, alumina, iron oxide, cerium oxide, cerium hydroxide, carbon black, etc.

The addition amount of each component comprised in the adhesive is not particularly limited and can be appropriately set. Such addition-curable silicone rubber adhesives are commercially available and easily obtainable. The thickness of the adhesive layer is preferably 20 μm or less. If the thickness of the adhesive layer 20*f* is set to 20 μm or less, when the fixing belt according to this aspect is used as a heating belt in a thermal fixing apparatus, heat resistance can be easily set to be small and heat from the inner surface can be easily efficiently transferred to a recording medium.

(7) Surface Layer

The fixing rotating member has a surface layer 20*d* on the outer circumferential surface of the elastic layer 20*c*.

The surface layer 20*d* preferably comprises a fluorocarbon resin for exhibiting the function as the release layer for preventing the deposition of a toner onto the outer surface of the fixing rotating member. For the formation of the surface layer 20*d*, for example, the one obtained by molding the resins exemplified below into a tube shape may be used, or a resin dispersed solution may be coated for molding the surface layer 20*d*.

Tetrafluoroethylene-perfluoro (alkyl vinyl ether) copolymers (PFA), polytetrafluoroethylene (PTFE), tetrafluoroethylene-hexafluoropropylene copolymers (FEP), etc.

Among the resin materials exemplified above, PFA is particularly preferably used in consideration of moldability and toner releasability.

The thickness of the surface layer 20*d* is preferably set at 10 to 50 μm. By setting the thickness of the surface layer 20*d* within this range, it is easy to keep the appropriate surface hardness of the fixing rotating member.

Electrophotographic Image Forming Apparatus

An electrophotographic image forming apparatus (hereinafter simply referred to as an "image forming apparatus") comprises an image bearing member that carries a toner image, a transfer device that transfers a toner image to a recording material, and a fixing apparatus that fixes the transferred toner image to the recording material.

FIG. 1 is a transverse cross-sectional diagram showing an overall configuration of a color laser beam printer (hereinafter referred to as a printer) 1 as an example of an image forming device on which a fixing apparatus (image heating device) 15 according to an embodiment is mounted.

A cassette 2 is accommodated in the lower part of the printer 1 such that it can be pulled out. The cassette 2 loads and accommodates a sheet P as a recording material. The sheets P in the cassette 2 are fed to a registration roller 4 while being separated one by one by a separation roller 3.

Incidentally, as sheets P that are recording materials, various sheets having different sizes and materials including paper such as plain paper and heavy paper, a surface-treated sheet material such as a plastic film, a cloth, or coated paper, a sheet material in a special shape such as an envelope or index paper, and the like are usable.

A printer 1 comprises an image forming portion 5 as an image forming means comprising image forming portions 5Y, 5M, 5C, and 5K corresponding to respective colors of yellow, magenta, cyan, and black, respectively, provided side by side in a row therein. The image forming portion 5Y is provided with a photosensitive drum 6Y that is an image bearing member (an electrophotography photosensitive member) for bearing a toner image, and a charging roller 7Y as a charging means for uniformly charging the surface of the photosensitive drum 6Y.

Further, under the image forming portion 5, a scanner unit 8 is provided. The scanner unit 8 applies a laser beam ON/OFF modulated in response to the digital image signal inputted from an external device such as a computer not shown on the basis of image information, and generated by an image processing means, and forms an electrostatic latent image on a photosensitive drum 6Y.

Further, the image forming portion 5Y comprises a development roller 9Y as a development means for depositing a toner on the electrostatic latent image of the photosensitive drum 6Y, and performing development as a toner image (toner image), and a primary transfer portion 11Y for transferring the toner image on the photosensitive drum 6Y to the intermediate transfer belt 10.

Onto the toner image of the intermediate transfer belt 10 to which the toner image has been transferred at the primary transfer portion 11Y, the toner images formed by the same process at other image forming portions 5M, 5C, and 5K are multiply transferred.

Accordingly, a full-color toner image is formed on the intermediate transfer belt 10. The full-color toner image is transferred onto the sheet P by a secondary transfer unit 12 as a transfer means. The primary transfer unit 11Y and the secondary transfer unit 12 are examples of a fixing apparatus that fixes the transferred toner image to the recording material.

Then, the toner image transferred onto the sheet P (onto the recording material) passes through the fixing apparatus 15 and is fixed as a fixed image. In addition, the sheet P passes through a discharge transport unit 13 and is discharged to and loaded on a loading unit 14.

Here, the image forming unit 5 is an example of the image forming means. While the primary transfer unit 11Y and the secondary transfer unit 12 are exemplified as the fixing apparatus, the fixing apparatus may be, for example, a direct transfer type fixing apparatus that directly transfers the toner image from the image bearing member to the sheet P. In addition, the image forming device may have a monochrome type configuration using only one color toner.

Fixing Apparatus

The fixing apparatus 15 is a fixing apparatus (an image heating device) of an induction heating system for causing the fixing rotating member to generate heat by electromagnetic induction. Namely, the fixing apparatus comprises a fixing rotating member and an induction heating device for heating the fixing rotating member by induction heating. As the fixing rotating member, the fixing rotating member described above can be used.

FIG. 2 shows the cross sectional configuration of the fixing apparatus 15, and FIG. 3 is a perspective view of the fixing apparatus 15. Incidentally, the housing or the like of the fixing apparatus 15 is omitted in FIGS. 2 and 3.

The fixing device 15 comprises the fixing rotating member 20, a film guide 25, a pressing roller 21, a pressing stay 22, a magnetic core 26, an excitation coil 27, a thermistor 40 and a current sensor 30. The fixing device 15 heats the recording material on which the image is formed and fixes the image to the recording material. The fixing rotating member 20 is a rotating member of the present embodiment, and the pressure roller 21 is the opposing member of the present embodiment. Further, the excitation coil 27 functions as a magnetic field generating means of the present embodiment. The fixing rotating member will be described in details later.

The fixing rotating member 20 comprises a first resin layer, at least one heating layer, a second resin layer, an elastic layer, and a surface layer.

The heating layer 20*b* can generate heat by, for example, induced current. Namely, the heating layer 20*b* is a conductive layer. The heating layers 20*b* is formed as a heating pattern in which heating rings 201 (FIG. 3) respectively electrically connected in the circumferential direction with one another, and each formed in a ring shape, and electrically divided in the longitudinal direction X1 (the rotation axis direction of the fixing rotating member 20) are arrayed in the longitudinal direction.

In other words, the heating layer 20*b* can be configured to be divided into a plurality of annular regions respectively connected in the circumferential direction of the fixing rotating member 20, the plurality of annular regions not conducting to one another with respect to the rotation axis direction of the fixing rotating member 20. Each heating ring 201 that is the constituent element of the heating pattern is preferably formed with a uniform width with respect to the longitudinal direction X1.

As described above, the heating layer may be formed as the heating layer group comprising a plurality of heating layers. The heating layer group is configured by, for example, a plurality of heating layers formed spaced apart on the outer circumferential surface of the first resin layer.

The pressure roller 21 as the opposing body (pressuring member) opposed to the fixing rotating member 20 comprises a core metal 21*a*, and an elastic layer 21*b* molded and coated around the core metal concentrically and integrally, and a release layer 21*c* is provided on the surface layer. The elastic layer 21*b* is preferably a material excellent in heat resistance such as silicone rubber, fluorocarbon rubber, or fluorosilicone rubber. Then, both the ends in the longitudinal direction of the core metal 21*a* are provided in a manner held rotatably between chassis side sheet metals not shown of the apparatus via a conductive bearing.

Further, as shown in FIG. 3, pressurizing springs 24*a* and 24*b* are provided shrinkingly between both the ends of the pressurizing stay 22 and the apparatus chassis side spring bearing members 23*a* and 23*b*, respectively, thereby causing a push-down force to act on the pressurizing stay 22.

Incidentally, the fixing apparatus 15 of the present embodiment provides a pressing force with a total pressure of about 100 to 300 N (about 10 to 30 kgf). As a result of this, as shown in FIG. 2, the lower surface of the film guide 25 comprising polyphenylene sulfide (PPS) that is a heat resistant resin, or the like and the upper surface of the pressure roller 21 are pressure welded with the fixing rotating member 20 that is a cylindrical rotating member interposed therebetween, thereby forming a fixing nip portion N with a prescribed width.

Namely, the film guide 25 functions as a nip portion forming member for forming a nip portion for interposing and carrying a recording material bearing a toner image thereon via the fixing rotating member 20 together with the pressure roller 21.

The pressure roller 21 is rotatively driven in the clockwise direction by a driving means not shown, and causes a rotatory power in the counterclockwise direction to act on the fixing rotating member 20 by the frictional force with the outer surface of the fixing rotating member 20. As a result of this, the fixing rotating member 20 rotates while sliding on the film guide 25.

Figure 4:
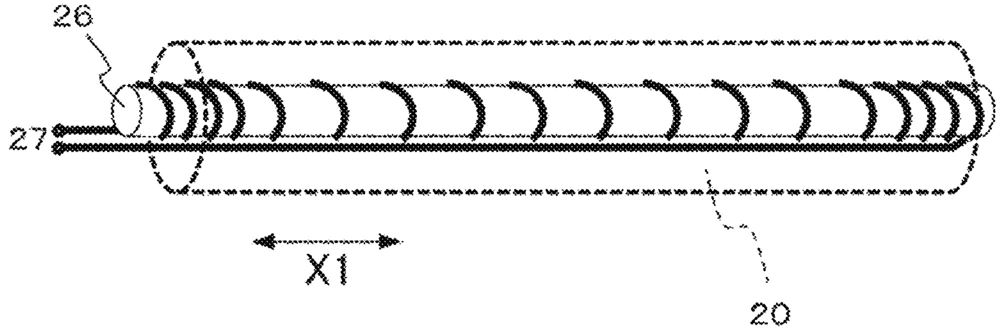
FIG. 4 is a schematic view of a magnetic core and an excitation coil of a fixing apparatus in accordance with an embodiment.

FIG. 4 is a schematic view of a magnetic core 26 and an excitation coil 27 shown in FIG. 2, where the fixing rotating member 20 is indicated with a broken line for illustrating the positional relationship with the fixing rotating member 20. The induction heating device in the fixing apparatus of the induction heating system for causing the fixing rotating member 20 to generate heat by electromagnetic induction may comprise the magnetic core 26 and the excitation coil 27.

The excitation coil 27 is arranged in the inside of the fixing rotating member 20. The excitation coil 27 has a helical shape portion in which the screw axis is substantially in parallel with the direction along the rotation axis of the fixing rotating member 20, and forms an alternating magnetic field for causing the heating layer 20*b* to perform electromagnetic induction heating. The term "substantially in parallel" means not only two axes being completely in parallel with each other, but also slight deviation to such an extent that the heating layer can perform electromagnetic induction heating being allowed.

The magnetic core 26 is arranged in the helical shape portion, extends in the rotation axis direction of the fixing rotating member 20, and does not form a loop outside the fixing rotating member 20. The magnetic core 26 induces a line of magnetic force of the alternating magnetic field.

In FIG. 4, the magnetic core 26 is inserted into the hollow portion of the fixing rotating member 20 that is a tubular rotating member. Further, the excitation coil 27 is helically wound around the outer circumference of the magnetic core 26, and extends in the longitudinal direction of the fixing rotating member 20. The magnetic core 26 is in a cylindrical shape, and is fixed by a fixing means not shown so as to be located at substantially the center of the fixing rotating member 20 in cross section as seen in the longitudinal direction (see FIG. 2).

The magnetic core 26 provided in the inside of the excitation coil 27 has a role of inducing the line of magnetic force (magnetic flux) of the alternating magnetic field generated at the excitation coil 27 to the inside of the heating layer 20*b* of the fixing rotating member 20, and forming the passage (magnetic path) of the line of magnetic force. The material for the magnetic core 26 is a ferromagnetic body. The ferromagnetic body is preferably a material with a small hysteresis loss, and a high relative magnetic permeability, and is preferably at least one soft magnetic body with a high magnetic permeability selected from the group consisting of, for example, burnt ferrite and a ferrite resin.

The cross sectional shape of the magnetic core 26 may only be a shape that can be accommodated in the hollow portion of the fixing rotating member 20. Although the cross sectional shape of the magnetic core 26 is not required to be a circular shape, it is preferably a shape with as large a cross sectional area as possible. In the present embodiment, the diameter of the magnetic core 26 was set at 10 mm, and the length in the longitudinal direction was set at 280 mm.

The excitation coil 27 can be formed by, for example, winding a copper wire (single lead wire) with a diameter of 1 to 2 mm coated with a heat resistant polyamide imide around the magnetic core 26 helically in a double winding manner. The excitation coil 27 is wound in the direction crossing the rotation axis direction of the fixing rotating member 20 at the outer circumference of the magnetic core 26. For this reason, when a high frequency alternating current is passed through the excitation coil 27, an alternating magnetic field is generated in the direction in parallel with the rotation axis direction, and an induced current (circulating current) passes through each heating ring 201 of the heating layer 20*b* of the fixing rotating member 20 according to the principle described later, so that the heating ring 201 generates heat.

As shown in FIG. 2 and FIG. 3, the thermistor 40 as a temperature detection means that detects the temperature of the fixing rotating member 20 comprises a spring plate 40*a* and a thermistor element 40*b*. The spring plate 40*a* is a support member having spring elasticity which extends toward the inner surface of the fixing rotating member 20. The thermistor element 40*b* as a temperature detection element is installed at the tip of the spring plate 40*a*. The surface of the thermistor element 40*b* is covered with a 50 μm-thick polyimide tape in order to secure electrical insulation.

The thermistor 40 is fixed to the film guide 25 and installed at a substantially central position of the fixing rotating member 20 in the longitudinal direction. The thermistor element 40*b* is pressed against the inner surface of the fixing rotating member 20 according to spring elasticity of the spring plate 40*a* and is held in a contact state. Here, the thermistor 40 may be arranged on the outer circumferential side of the fixing rotating member 20.

A current sensor 30 configuring a conduction monitoring device for monitoring the conduction in the circumferential direction of the heating layer 20*b* is arranged at the same position as that of the thermistor 40 with respect to the longitudinal direction of the fixing apparatus 15. Namely, the current sensor 30 monitors the conduction state of the heating ring 201 located at the position at which the thermistor element 40*b* is in contact, of a plurality of heating rings 201 configuring the heating pattern of the fixing rotating member 20.

Heating Principle

A description will be given the heating principle of the fixing rotating member 20 in the fixing apparatus 15 of an induction heating system.

Figure 5:
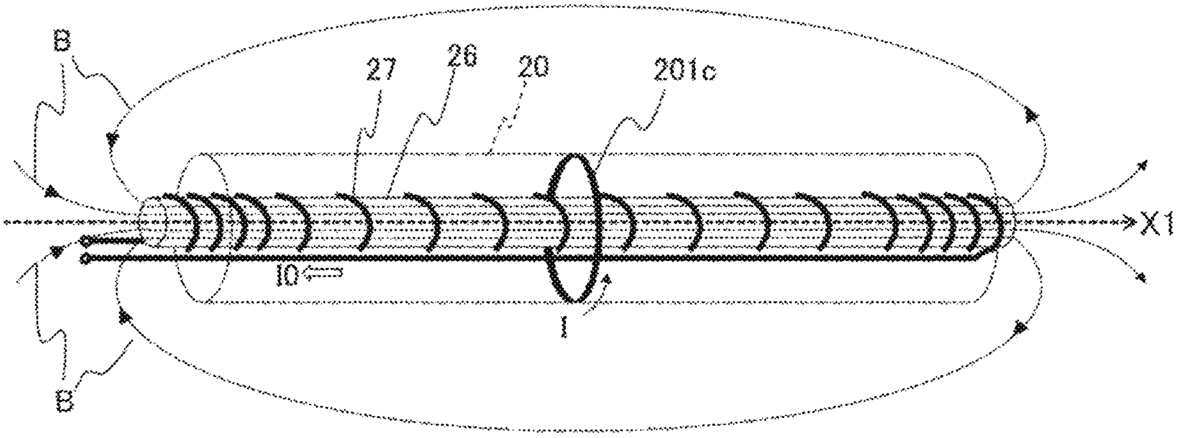
FIG. 5 is a view showing the magnetic field formed when a current is passed through an excitation coil in accordance with an embodiment.

FIG. 5 is a conceptual view showing the moment in which a current increases in the direction of an arrow 10 through the excitation coil 27. The excitation coil 27 is wound around the outer circumference of the magnetic core 26 inserted to the fixing rotating member 20. The passage of an alternating current forms an alternating magnetic field in the rotation axis direction of the fixing rotating member 20, and the excitation coil 27 functions as a magnetic field generating means for causing an induced current I in the circumferential direction of the fixing rotating member 20.

Further, the magnetic core 26 functions as a member for inducing the line of magnetic force B (a dotted line in FIG. 5) generated at the excitation coil 27, and forming a magnetic path.

With a fixing apparatus of a general induction heating system, the line of magnetic force penetrates through the inside of the heating layer, and generates an eddy current. In contrast, in the present embodiment, it is configured such that a line of magnetic force B loops outside the fixing rotating member 20. Namely, the induced current induced by the line of magnetic force coming out of one longitudinal end of the magnetic core 26, passing through the outside of the heating layer 20*b*, and returning to the other longitudinal end of the magnetic core 26 mainly causes the heating layer 20*b* to generate heat. With this configuration, even when the thickness of the heating layer 20*b* is as thin as, for example, 5 μm or less, heating can be implemented with efficiency.

When an alternating magnetic field is formed by the excitation coil 27, the induced current I following the Faraday's law flows through each heating ring 201 of the heating layer 20*b* of the fixing rotating member 20. The Faraday's law is that "when the magnetic field in a circuit is changed, an induced electromotive force to make a current flow through the circuit is generated, and the induced electromotive force is proportional to the change with time of the magnetic flux penetrating perpendicularly through the circuit".

Regarding a heat generation ring 201*c* positioned in the center part of the magnetic core 26 shown in FIG. 5 in the longitudinal direction, an induced current I that flows through the heat generation ring 201*c* when a high-frequency alternating current flows through the excitation coil 27 is considered. When a high-frequency alternating current flows, an alternating magnetic field is generated inside the magnetic core 26. In this case, an induced electromotive force applied to the heat generation ring 201*c* is proportional to a change in the magnetic flux over time, which vertically penetrates the inside of the heat generation ring 201*c* according to the following Numerical Expression 1.

$$V = -N\frac{\Delta\Phi}{\Delta t} \qquad \text{(Numerical Expression 1)}$$

V: induced electromotive force

N: number of coil turns

ΔΦ/Δt: change in the magnetic flux that vertically penetrates the circuit (the heat generation ring 201*c*) in a minute time Δt The induced electromotive force V causes passage of an induced current I that is the circulating current through the heating ring 201*c*, so that the heating ring 201*c* generates heat due to the Joule's heat arising from the induced current I. However, when the heating ring 201*c* is disconnected, the induced current I does not flow, and the heating ring 201*c* does not generate heat.

EXAMPLES

The present disclosure will be described in more detail hereinbelow with reference to Examples, but the present disclosure is not limited thereto.

Example 1

The surface of a cylindrical stainless steel mold with an outer diameter of 30 mm was subjected to a mold release treatment, and was coated with a commercially available polyimide precursor solution (trade name: Uvarnish S, manufactured by UBE Industries, Ltd.) by the immersion method, thereby forming a coating film. Then, the coating film was dried at 140° C. for 30 minutes, thereby volatilizing the solvent in the coating film, followed by burning at 200° C. for 30 minutes, and at 400° C. for 30 minutes, thereby causing imidization. As a result, a first resin layer (base layer) with a film thickness of 30 μm, and a length of 300 mm was formed.

Then, in a central region at a distance of 110 mm from the midpoint in the longitudinal direction toward both ends in the longitudinal direction on the outer circumferential surface of the base layer, namely, of L1=220 mm, using a silver nanoparticle-blended ink (DNS163, manufactured by Daicel Corporation), with the ink jet method, a plurality of ring-shaped patterns were formed so that the longitudinal width became 300 μm, and the longitudinal space became 200 μm, and over the entire circumference of the base layer. Thereafter, burning was performed at a temperature of 300° C. for 30 minutes, thereby forming a heating layer with a thickness of 2.5 μm, and a width of 300 μm, and comprising a plurality of heating rings extending in the full circumferential direction of the base layer. Therefore, for the fixing belt in accordance with the present Example, the end region was a region up to 4.4 mm from both ends toward the center in the longitudinal direction of the heating layer.

Then, a PAI solution (Vylomax HR-16NN, manufactured by TOYOBO CO., LTD.) was applied onto the entire surface of the heating layer by ring coating. By controlling the liquid feeding amount and the passing speed of ring coating, the thicknesses of the central part and the end were changed. Burning was performed at 230° C. for 30 minutes, thereby forming a second resin layer with a thickness of the central region of 35 μm, and a thickness of the end region of 47 μm.

Then, onto the outer circumferential surface of the second resin layer, a primer (trade name: DY39-051A/B, manufactured by DOW and TORAY Co.) was applied substantially uniformly so that the dry weight became 20 mg, and the solvent was dried. Then, a baking treatment was performed for 30 minutes in an electric furnace set at 160° C.

On the primer, a silicone rubber composition layer with a thickness of 200 μm was formed with the ring coating method, and primary crosslinking was performed at 160° C. for 1 minute, followed by secondary crosslinking at 200° C. for 30 minutes, thereby forming an elastic layer 20*c*.

Here, the following silicone rubber composition was used.

As an organopolysiloxane having an alkenyl group as the component (a), a vinylated polydimethylsiloxane having at least two or more vinyl groups in one molecule (product name: DMS-V41, commercially available from Gelest, a number-average molecular weight of 68,000 (in terms of polystyrene), a vinyl group molar equivalent of 0.04 mmol/g) was prepared.

In addition, as an organopolysiloxane having Si—H groups as the component (b), a methyl hydrogen polysiloxane having at least two or more Si—H groups in one molecule (product name: HMS-301, commercially available from Gelest, a number-average molecular weight of 1,300 (in terms of polystyrene), a Si—H group molar equivalent of 3.60 mmol/g) was prepared. 0.5 parts by mass of the component (b) was added to 100 parts by mass of the component (a) and sufficiently mixed to obtain an addition-curable silicone rubber stock solution.

In addition, regarding the amount of the catalyst (component (c)), a very small amount of an addition-curing reaction catalyst (platinum catalyst: platinum carbonylcyclovinylmethylsiloxane complex) and an inhibitor were added and sufficiently mixed.

High-purity true spherical alumina (product name: Alumina Beads CB-A10S; commercially available from Showa Titanium Co., Ltd.) as a thermally conductive filler (component (d)) was added to and kneaded with the addition-curable silicone rubber stock solution at a volume ratio of 45 volume % based on the elastic layer. Then, an addition-curable silicone rubber composition having a durometer hardness of 10° according to Japanese Industrial Standard (JIS) K 6253-3:2023 (Type A Durometer hardness) after curing was obtained.

Next, an addition-curable silicone rubber adhesive (product name: SE1819CV A/B, commercially available from Dow Toray Co., Ltd.) for forming the adhesive layer 20*f* was applied substantially uniformly onto the obtained elastic layer 20*c* so that the thickness was about 20 μm. A fluororesin tube with an inner diameter of 29 mm and a thickness of 50 μm (product name: NSE, commercially available from Gunze Ltd.) for forming the surface layer 20*d* was laminated thereon while expanding its diameter.

Then, by uniformly rubbing the surface of the belt from above the fluororesin tube, an excessive adhesive was removed from between the elastic layer 20*c* and the fluororesin tube so that the thickness was as thin as 5 μm. Next, the adhesive was cured by heating at 200° C. for 30 minutes, the fluororesin tube was fixed on the elastic layer 20*c*, and finally both ends were cut to have a length of 240 mm to obtain a fixing belt.

Examples 2 and 3, Comparative Examples 1 and 2

Each fixing belt in accordance with Examples 2 and 3, and Comparative Examples 1 and 2 was manufactured in the same manner as in Example 1, except for changing the thicknesses of the first resin layer and the second resin layer on the basis of the standard described in Table 1.

Evaluation: Thickness and Elastic Modulus of Each Layer

As for each fixing belt manufactured in Examples 1 to 3, and Comparative Examples 1 and 2, the cross section along the circumferential direction was observed, and the thickness of each layer was measured. A total of 6 samples each 5 mm long and 5 mm wide, and with a thickness of the overall thickness of the fixing rotating member were collected from the fixing belt, one from each of 6 sites of the fixing belt. Each obtained sample was subjected to polishing processing so that the cross section was exposed using an ion milling device (trade name: IM4000, manufactured by Hitachi High-Tech Corporation).

Subsequently, the cross section in the thickness direction of the fixing rotating member was observed with scanning electron microscope observation (SEM) (trade name: FE-SEM JSM-F100, manufactured by JEOL Ltd.), thereby acquiring a cross sectional image. The observation conditions were set at 200- to 5000-fold backscattered electron image mode, and the backscattered electron image acquisition conditions were set at an acceleration voltage: 3.0 kV, and a working distance: 3 mm. From the cross sectional image obtained in this manner, the thickness of each layer was measured, and the average value of those of 6 samples are referred to as the average thickness.

Further, for the sample whose cross section had been exposed by the foregoing method, the elastic modulus of each layer was measured by a scanning probe microscope (SPM) (trade name: Dimension ICON, manufactured by Bruker Co.).

Specifically, for the sample whose cross section had been exposed by the foregoing method, the elastic modulus was calculated from the elastic modulus mapping image measured and obtained under the measurement conditions of a spring constant of 0.315 N/m, an indentation load of 200 pN, the number of pixels of 512×512, and a visual field: 1.2 μm×1.2 μm.

Evaluation: Confirmation of Neutral Axis in Thickness Direction of Fixing Rotating Member The position of the neutral axis in the thickness direction of the fixing rotating member was confirmed in the following manner.

The thickness and the elastic modulus of each layer were calculated by the foregoing method. From each obtained value, using the formula (2), the distance between the surface of the fixing rotating member and the neutral axis was calculated. The position of the neutral axis was identified from the obtained distance, and the thickness from the outer surface of the fixing rotating member to each layer.

Evaluation: Durability Test

Each fixing rotating member manufactured in Examples 1 to 3, and Comparative Examples 1 and 2 was mounted at the fixing apparatus, and paper feed rotation was caused. The degree of an increase in resistance due to continuous rotation was confirmed. The electric resistance value was calculated from the value of the current which flowed when an excitation coil was applied with a voltage of 1 V.

The number of paper sheets fed up to the time point at which the resistance value became 105% or more with the initial resistance value assumed as the standard (100%) is referred to as the number of durable sheets. On the basis of the following standards, the durability of the fixing rotating member was evaluated.

Evaluation Criteria

A: number of durable sheets is 300000 or more

B: number of durable sheets is 200000 or more and less than 300000

C: number of durable sheets is less than 200000

The material, the physical properties, and the evaluation results of the fixing rotating member are shown in Tables 1 and 2.

TABLE 1

| | | First resin layer (base layer) Material | Average thickness μm Central region B0 | Average thickness μm End region B1 | Elastic modulus GPa Central region EB(Tc) 180° C. | Elastic modulus GPa End region EB(Te) 230° C. | Second resin layer (protective layer) Material | Average thickness μm Central region A0 |
|---|---|---|---|---|---|---|---|---|
| Examples | 1 | PI | 30 | 30 | 5.4 | 4.5 | PAI | 35 |
| | 2 | PI | 40 | 40 | 5.4 | 4.5 | PAI | 47 |
| | 3 | PI | 50 | 50 | 5.4 | 4.5 | PAI | 59 |
| Comparative | 1 | PI | 40 | 40 | 5.4 | 4.5 | PAI | 40 |
| Examples | 2 | PI | 40 | 40 | 5.4 | 4.5 | PAI | 47 |

| | | Second resin layer (protective layer) Average thickness μm End region A1 | Elastic modulus GPa Central region EA(Tc) 180° C. | Elastic modulus GPa End region EA(Te) 230° C. | Neutral axis Central region Position | Neutral axis End region Position | Number of durable sheets k sheets Central region | Number of durable sheets k sheets End region |
|---|---|---|---|---|---|---|---|---|
| Examples | 1 | 47 | 4.6 | 2.9 | In layer heating | In layer heating | A 300 | A 300 |
| | 2 | 62 | 4.6 | 2.9 | In layer heating | In layer heating | A 300 | A 300 |
| | 3 | 78 | 4.6 | 2.9 | In layer heating | In layer heating | A 300 | A 300 |
| Comparative Examples | 1 | 40 | 4.6 | 2.9 | In first resin layer | In first resin layer | B 220 | C 100 |
| | 2 | 47 | 4.6 | 2.9 | In layer heating | In first resin layer | A 300 | C 160 |

In Table 1, the term "k sheets" of the durability evaluation means "×1000 sheets". For example, 300 k sheets indicates 300×1000=300000 sheets.

TABLE 2

| | | Material | EB(Tc)/ EA(Tc) × B0 | EB(Te)/ EA(Te) × B1 | A0 × EA(Tc) | 1.2 × B0 × EB(Tc) | A1 × EA(Te) | 1.2 × B1 × EB(Te) |
|---|---|---|---|---|---|---|---|---|
| Examples | 1 | PI | 35.2 | 46.6 | 161.0 | 194.4 | 136.3 | 162.0 |
| | 2 | PI | 47.0 | 62.1 | 216.2 | 259.2 | 179.8 | 216.0 |
| | 3 | PI | 58.7 | 77.6 | 271.4 | 324.0 | 226.2 | 270.0 |
| Comparative | 1 | PI | 47.0 | 62.1 | 184.0 | 259.2 | 116.0 | 216.0 |
| Examples | 2 | PI | 47.0 | 62.1 | 216.2 | 259.2 | 136.3 | 216.0 |

The results of Table 1 can confirm that Examples 1 to 3 in each of which the position of the neutral axis was set in view of the temperatures of the central region and the end region are more excellent in durability as compared with Comparative Examples 1 and 2.

As described up to this point, the present disclosure can be used for the fixing rotating member excellent in durability even when the heating layer is interposed between different materials. Further, the present disclosure can be used for the fixing apparatus comprising a fixing rotating member excellent in durability arranged therein. Further, the present disclosure can be used for an electrophotographic image forming apparatus using the fixing apparatus.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-185008, filed Oct. 27, 2023, which is hereby incorporated by reference herein in its entirety.

What is claimed is:

1. A fixing rotating member comprising:

a first resin layer having an endless shape;

at least one heating layer on an outer circumferential surface of the first resin layer;

a second resin layer on an outer circumferential surface of the heating layer;

an elastic layer on an outer circumferential surface of the second resin layer; and, a surface layer on an outer circumferential surface of the elastic layer, wherein the first resin layer and the second resin layer are different from each other in elastic modulus at a temperature Tc, which is from 160 to 200° C., by at least 10%, and when a temperature of an outer surface in a central region of the fixing rotating member is referred to as Tc, and a temperature of an outer surface in an end region is referred to as Tc+50° C., a neutral axis in a thickness direction of the fixing rotating member is located in the heating layer or in the second resin layer in the central region and the end region, for the central region and the end region, when a number of heating layers observed at a cross section in a width direction orthogonal to a circumferential direction of the fixing rotating member is one, the end region is a region from both ends in the width direction up to 0.02×L1 toward a center in the width direction of the heating layer, and the central region is a region from the center up to 0.48×L1 toward both ends, where the L1 is a length from one end to the other end of the heating layer, and when the number of the heating layers observed at a cross section in the width direction orthogonal to the circumferential direction of the fixing rotating member is plural, the end region is a region from both ends in the width direction of a heating layer group comprising the plurality of heating layers up to 0.02×L2 toward the center in the width direction, and the central region is a region from the center up to 0.48×L2 toward the both ends, where the L2 is a length from one end to the other end of the heating layer group.

2. The fixing rotating member according to claim 1, wherein when, in the central region, A0 represents an average thickness of the second resin layer and B0 represents an average thickness of the first resin layer, in the end region, A1 represents an average thickness of the second resin layer and B1 represents an average thickness of the first resin layer, EA(Tc) represents an elastic modulus of the second resin layer at the temperature Tc, and EB(Tc) represents an elastic modulus of the first resin layer at the temperature Tc, and, Te represents the temperature of the outer surface in the end region, EA(Te) represents an elastic modulus of the second resin layer at the temperature Te, and EB(Te) represents an elastic modulus of the first resin layer at the temperature Te, the A0, the B0, the A1, the B1, the EA(Tc), the EB(Tc), the EA(Tc), and the EB(Tc) satisfy formulae (3) to (6) below:

$$A0 \geq EB(Tc)/EA(Tc) \times B0 \quad \text{formula (3)}$$

$$A1 \geq EB(Te)/EA(Te) \times B1 \quad \text{formula (4)}$$

$$A0 \times EA(Tc) \leq 1.2 \times B0 \times EB(Tc) \quad \text{formula (5)}$$

$$A1 \times EA(Tc) \leq 1.2 \times B1 \times EB(Te). \quad \text{formula (6)}$$

3. The fixing rotating member according to claim 2, wherein the EB(Tc) is larger than the EA(Tc), and the EB(Te) is larger than the EA(Te).

4. The fixing rotating member according to claim 1, wherein the first resin layer comprises at least one selected from the group consisting of polyimide, polyamide imide, modified polyimide, and modified polyamide imide.

5. The fixing rotating member according to claim 1, wherein the second resin layer comprises at least one selected from the group consisting of polyimide, polyamide imide, modified polyimide, and modified polyamide imide.

6. The fixing rotating member according to claim 1, wherein the first resin layer comprises polyimide, and the second resin layer comprises polyamide imide.

7. The fixing rotating member according to claim 1, wherein the elastic layer comprises silicone rubber, and the surface layer comprises a fluorocarbon resin.

8. A fixing apparatus, comprising:

the fixing rotating member according to claim 1; and an induction heating device for heating the fixing rotating member by induction heating.

9. An electrophotographic image forming apparatus, comprising:

an image bearing member that carries a toner image;

a transfer device that transfers the toner image to a recording material; and a fixing apparatus that fixes the transferred toner image to the recording material, wherein the fixing apparatus is the fixing apparatus according to claim 8.

* * * * *